July 2, 1929.  M. WATTER  1,719,799
AIRCRAFT
Filed Sept. 29, 1928  2 Sheets-Sheet 1

INVENTOR
Michael Watter;
BY Eyre Scott & Keel
ATTORNEYS

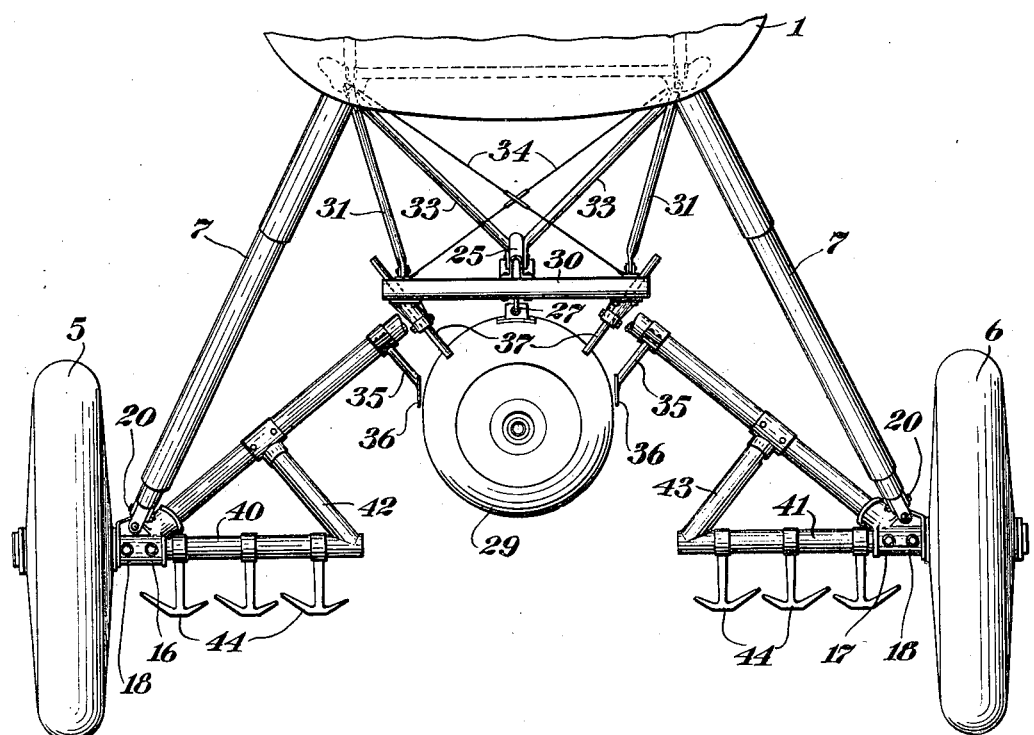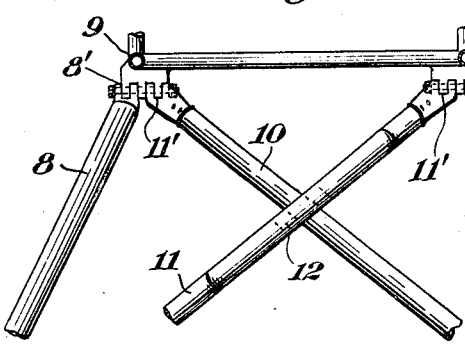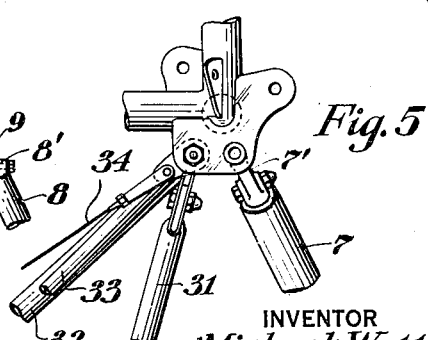

Patented July 2, 1929.

1,719,799

UNITED STATES PATENT OFFICE.

MICHAEL WATTER, OF NEW YORK, N. Y., ASSIGNOR TO CHANCE M. VOUGHT, OF GREAT NECK, NEW YORK.

AIRCRAFT.

Application filed September 29, 1928. Serial No. 309,141.

This invention relates to airplanes.

One object of the invention is a novel and improved method and means for suspending and laterally stabilizing a bomb, projectile or the like underneath the craft. Another object of the invention is a novel arrangement and construction of combined landing gear and suspending means for bombs or the like. A further object of the invention is the suspension of a bomb or the like between the independently movable parts of a split axle landing gear with the relatively movable landing gear parts carrying lateral stabilizing means for the bomb, and in such manner that the operation of the landing gear remains unimpaired and the bomb may be laterally stabilized and launched with certainty and facility. A still further object is the coordination of a suspending arrangement of the above indicated character with a landing gear of the non-steering type whose independently movable parts are capable of movement only in the fore and aft direction and which have a four-point attachment with the fuselage or the airplane frame, the minimum weight combination and other marked advantages of the four-point non-steering gear being retained, while the suspension devices and the landing gear are readily interchangeable with a pontoon or floating structure to convert the craft into a water machine.

A still further object of the invention is a landing gear of the split axle type with independently movable landing gear units having a special arrangement for carrying axle hooks for effecting deck landings, without interfering with the bomb suspending and carrying devices.

For a better understanding of the above indicated novel feature and others which will hereinafter appear, reference may be had to the accompanying drawings, wherein—

Fig. 3 is a front view thereof; and

Figs. 4 and 5 are detail views.

Figure 1:
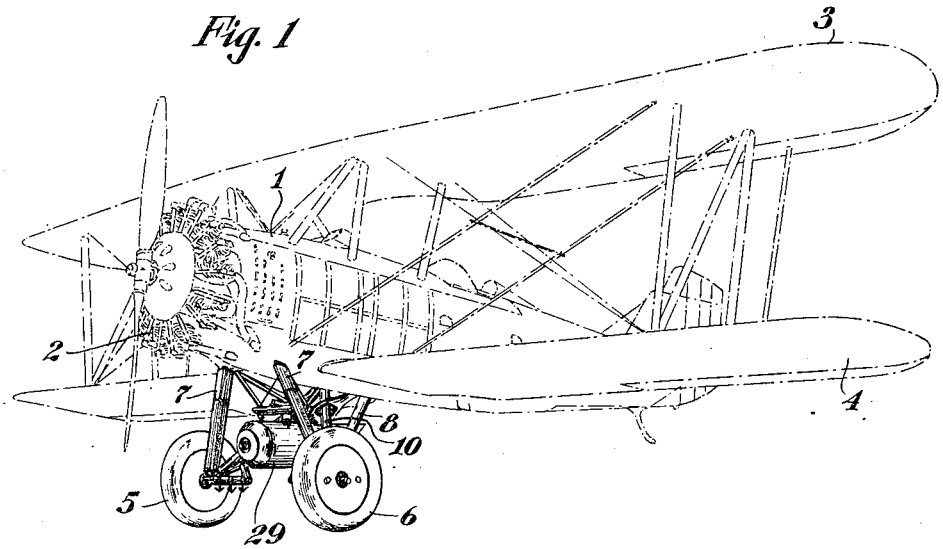
Fig. 1 is a three-quarter front view of an airplane embodying my invention.

I have indicated my invention as embodied in an airplane including a main body or fuselage 1, a motor or power plant 2 and a biplane including the upper and lower wings 3 and 4 respectively, but it is understood that the invention is not restricted to any particular type of airplane.

The landing gear includes a pair of independently yieldable wheels 5 and 6, these wheels preferably being movable only in the fore and aft direction and each of them being carried off to one side of the fuselage by three struts, including a side pair of struts 7 and 8 which are attached to a bottom longéron 9 of the fuselage and a third strut which extends rearwardly and laterally of the machine and is connected to the opposite side or longéron 9 of the fuselage adjacent the pivotal point 8' on that side. The third strut carrying the wheel 6 is indicated at 10 and the third strut carrying the wheel 5 is indicated at 11, these struts 10 and 11 extending rearwardly and laterally from the wheels 6 and 5 respectively and being pivotally connected to the bottom of the fuselage at 11' at or adjacent the pivotal points 8' of the outer struts 8 for fore and aft swinging of the struts. The rear struts 10, 11 and 8 are normally disposed in a plane including the axis of the wheels and the pivotal points 8', and accordingly the struts 10 and 11 cross each other, a special off-set arrangement as described below being provided to permit the struts 10 and 11 to pivot in the fore and aft direction independently of each other.

At a position forward of the crossing point of the struts 10 and 11 there is carried beneath the fuselage a bomb suspending frame including a bar 25 and a member 26 fixed to the under side thereof and carrying suitable retaining hooks 27, 28 for releasably suspending a bomb 29 between the landing gear units including the wheels 5 and 6 and underneath the crossing struts 10 and 11. The frame 25, 26 and the retaining and releasing means 27, 28 may be of any standard construction and need not be described in detail. The carrying frame also includes a transverse stream lined frame member 30 just forward of the member 26 and fixed to the under side of the fore and aft bar 25. The whole is rigidly suspended and spaced from the underside of the fuselage by means of a pair of forward struts 31 connected at their lower ends to the outer ends of the transverse member 30 and slightly diverging upwardly for connection with the fittings to which the landing gear struts 7 are connected; also a pair of rearwardly disposed struts 32 connected at their lower ends rigidly with the rear end of the bar 25 and diverging upwardly and fastened by suitable fittings 32' to the longérons 9 and a pair of diagonal struts 33 connected respectively at their forward ends with the fittings to which the upper ends of the struts 31 are attached with their rearward ends converging and extending downwardly for rigid connection with the rear end of the bar 25 at or adjacent the point of connection with the struts 32. The strut system for the bomb carrying frame is also provided with a pair of diagonal tension wires 34 connected in the plane of the struts 31 and respectively with the upper and lower fittings to which the struts 31 are attached. The bomb 29 may thus be suspended within the V formed by the crossing struts 10 and 11 without interfering with the operation of the independently movable landing gear units, and for laterally stabilizing the bomb 29 there is provided the special stabilizers 35 which are carried by the diagonal fore and aft movable struts 10 and 11 of the landing gear units, the stabilizers 35 being rigidly carried by these struts and having guiding or stabilizing shoes 36 which are adapted to engage the bomb and hold it in accurate fore and aft alinement while maneuvering the craft in the air, while the landing gear units are free to move independently of each other and independently of the bomb while landing or while taxiing on the ground or taking off, the shoes 36 merely sliding on the surface of the bomb if in engagement therewith. For assisting in the lateral stabilization I provide the fixed stabilizers 37 which are carried by the outer ends of the transverse frame member 30 and extend radially inwardly to engage the surface of the bomb at points substantially forward of the position of the relatively movable stabilizers 36.

Figure 2:
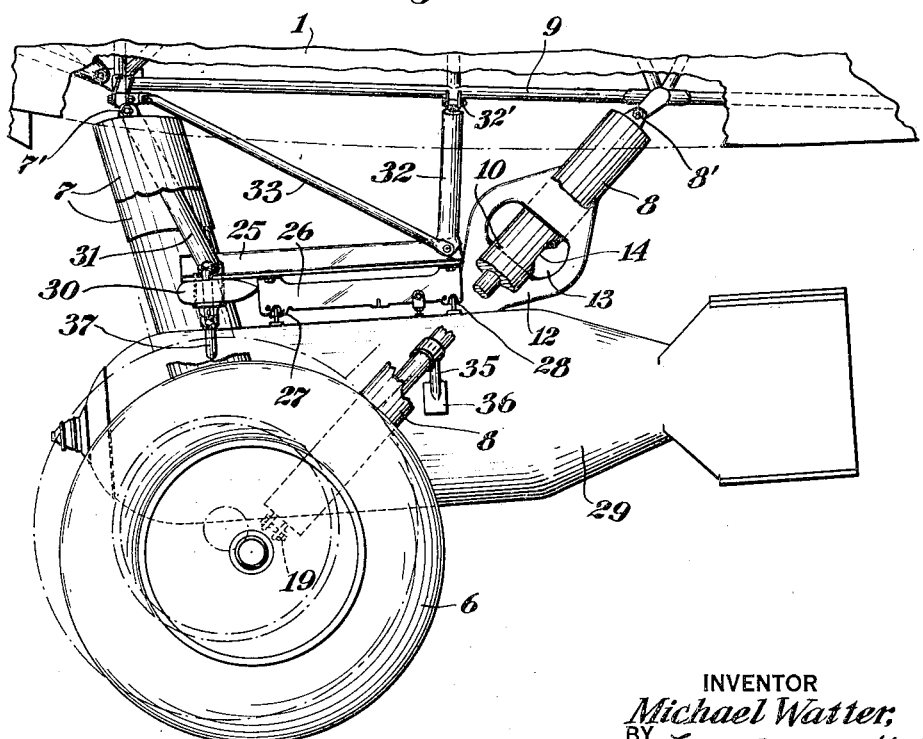
Fig. 2 is a side view with certain parts broken away.

The landing gear struts, as indicated above, include the forward struts 7 which extend upwardly and forwardly and are connected to the opposite sides of the bottom of the fuselage 1 at points forward of the wings 3 and 4, and rear struts 8 which extend upwardly and rearwardly and are connected with the opposite sides of the bottom of the fuselage at points substantially midway of the fore and aft edges of the wing 4. The struts 7 and 8 are connected to the bottom longérons 9 of the fuselage and are pivoted thereto on substantially horizontal and transverse pivots to permit the wheels carried thereby to yield and move only in a substantially fore and aft direction in a vertical plane, two of these struts, as for example the forward struts 7, being of standard shock absorbing character, the pivot points of the struts 7 and 8 being indicated at 7' and 8' respectively. The connections 11' are firm and rigid swivel connections permitting only the fore and aft swivelling movements of the struts 10 and 11, and the latter are rigidly connected at their lower ends to form continuations of the stub axles 18 of the wheels. The struts 8 are connected with the axles 18 by means of inclined pivotal connections 19. The struts 7 are connected at their lower ends by means of universal connections 20 to the axles 18 for free fore and aft pivoting movements of the latter, and likewise the pivots 7' are universal connections corresponding to the connections 20. We have, therefore, a landing gear supported at four points or stations on the bottom of the fuselage, namely, the points 7' and 8', the pivots 8' and 11' on a side being practically one station, and comprising in fact a single pivot pin carried by a single bracket. The pivots 11' and pivotal connections at 7' and 8' permit the three struts carrying a wheel to pivot in a fore and aft direction to carry the wheel only in a substantially vertical plane, as indicated, for example, in dotted lines in Fig. 2. For offsetting the crossing struts 10 and 11 and permitting them to move independently of each other in the fore and aft direction, I have indicated the strut 11 as being enlarged or widened at the point 12 where the strut 10 crosses the strut 11, a transverse slot 13 being provided in this widened part 12 of the strut 11 to accommodate the strut 10 which passes freely therethrough, this slot 13 permitting the independent fore and aft pivoting movements of these two struts 10 and 11. In the particular embodiment illustrated I have shown the strut 10 as cut away on its rear side 14 to function with the slot 13 of the strut 11 in permitting the independent fore and aft pivoting movement of the two struts. Each wheel is prevented from lateral spread by its corresponding pair of rear struts,—for example, the wheel 6 is prevented from such lateral spread by means of its rear struts 8 and 10, which diverge upwardly and connect with the opposite sides of the bottom of the fuselage, and similarly, the wheel 5 is prevented from lateral movement by means of its pair of rear struts 8 and 11, which diverge and connect with the opposite sides of the bottom of the fuselage. Each pair of side struts 7 and 8 extends downwardly and outwardly from the lower longéron 9 of the fuselage convergingly to its corresponding wheel to provide for as large a tread as possible with due regard to a favorable angle between the pairs of rear struts 8 and 10 and 8 and 11. The relative angular arrangement indicated of the struts 7 and 8 in the fore and aft direction has also proven in practice to be particularly satisfactory.

I have indicated the stub axles 18 as continued inwardly to form the stub axles 40 and 41, these being conveniently formed separately from the stub axles 18 but connected therewith at 16 and 17. These stub axles 40 and 41 are rigidly connected and supported at their inner ends by means of the struts 42 and 43 respectively, which are disposed substantially at right angles to the struts 11 and 10 and are rigidly connected therewith. The frames 40, 42 and 41, 43 are thus rigidly formed into carrying units rigid with the independently mounted landing gears for carrying the arresting hooks 44, useful for effecting deck landings.

The operation of my combined landing gear and bomb suspension means is apparent from the above description. The independently movable gear units, including the wheels 5 and 6, are yieldable only in the fore and aft direction and in substantially vertical planes, the objectionable steering functions of prior gears of this type being thereby avoided, while the bomb suspension devices are correlated therewith in such manner as to provide for laterally stabilizing the bomb by the independently movable landing gear units and to avoid impairment of the operation of either the landing gear units or the bomb suspension devices, either one by the other. I have thus provided a combined landing gear and bomb suspension device including the two independent single wheeled landing gears with three supporting struts for each wheel; one being a shock absorber strut with both gears supported underneath the bottom of the fuselage at only four points or stations, with the bomb suspending devices disposed between the landing gears and forward of the rear crossing or diagonal struts. The employment of stub wings or special supporting parts extending laterally from the fuselage is rendered unnecessary and the landing gear loads are removed from the wing structure, thereby avoiding the unbalanced bending moment in the fuselage with an appreciable gain in net weight. The particular angular disposition and arrangement of the struts also contribute to the weight efficiency in design, while the weight of the bomb, projectile or the like is also concentrated underneath the fuselage between the gears, the suspension and stabilizing devices cooperating together in the manner above indicated. Each of the landing wheels and its supporting struts may be readily detached from the fuselage by disconnecting the same at the points 7′, 8′ and 11′, together with the similar detachment of the struts carrying the bomb suspension frame and the machine thereby readily converted to a seaplane by the attachment of a seaplane float and similarly such seaplane can be readily reconverted back to a land plane of the character herein set forth. While I have shown landing gears including wheels, it is understood that instead of wheels skids, floats or other equivalent devices may be used.

I claim:

1. In an airplane, the combination of means for suspending a bomb or the like with means for stabilizing the bomb including a stabilizing device carried by a part of the craft frame which is movable relatively to the frame in the normal operation of the craft.

2. In an airplane, the combination of means for suspending a bomb or the like with a movable landing gear and means carried by said movable landing gear for stabilizing a suspended bomb.

3. In an airplane, fixed means for suspending a bomb or the like underneath the craft, a fore and aft movable landing gear, and means for laterally stabilizing a suspended bomb including fixed stabilizers engaging the sides of the bomb and relatively movable stabilizers engaging the bomb at points longitudinally displaced from the fixed stabilizers and carried by the fore and aft movable gear.

4. An airplane of the character set forth in claim 2 wherein the landing gear is of the non-steering type and movable only in the fore and aft direction.

5. In an airplane means for releasably suspending a bomb or the like thereunder, a landing gear of the split axle type including a fore and aft movable wheel on either side of the bomb carried by struts pivotally fixed to the under side of the craft, and lateral stabilizing means including fixed stabilizers carried by the airplane framework and movable stabilizers carried by and movable with the landing gears.

6. In an airplane, means for fixedly but releasably suspending a bomb or the like underneath the craft, an independently movable landing gear unit on either side of said bomb suspending means but movable in the fore and aft direction only and lateral stabilizing means carried by said landing gear units and adapted to engage a suspended bomb in any position of the landing gear.

7. In an airplane a device for releasably suspending a bomb in the fore and aft direction underneath the craft, a system of supporting struts extending downwardly from the framework of the craft and carrying said device, movable landing gear units disposed on opposite sides of the bomb suspending device and lateral stabilizing means carried by said movable units and adapted to engage and stabilize the suspended bomb in any position of the movable landing gear.

8. In an airplane, means for fixedly but releasably suspending a bomb in the fore and aft direction underneath the craft, an independently movable landing gear unit on either side of the bomb, each having a diagonal strut member extending up to the under side of the craft and past the bomb suspending means, and lateral stabilizing means carried by said diagonal struts which are adapted to engage and laterally stabilize the suspended bomb in any position of the landing gear.

9. An airplane of the character set forth in claim 8 wherein the independent landing gear units are non-steerable and movable only in the fore and aft direction and the diagonal struts cross each other at a point above the bomb, said diagonal struts being offset at their point of crossing, with the lateral stabilizing means carried at points on the diagonal struts beneath the crossing point.

10. An airplane of the character set forth in claim 8 wherein the landing gear is provided with a four-point attachment to the under side of the craft, each of the independently movable landing gear units comprising a pair of upwardly diverging V-struts pivotally connected to the under side of the craft at points disposed substantially in the fore and aft direction and a diagonal strut pivotally attached to the under side of the craft adjacent a pivotal point of one of the struts of the opposite unit.

11. In an airplane a four-point landing gear unit including two independently fore and aft movable gears, each gear being carried by three struts including a diagonal strut and means supported by the diagonal struts for carrying deck landing hooks adjacent the wheels the means for carrying the deck landing hooks consisting of inwardly projecting stub axles supported at their inner ends by the diagonal struts.

12. In an airplane a pair of independently fore and aft movable landing gear units having frames including inwardly directed struts and having inwardly projecting stub axles carrying deck landing hooks, said stub axles being supported at their inner ends by struts rigidly fastened to the frame struts midway their ends.

13. In an airplane of the character set forth in claim 6 wherein each independently movable landing gear unit is provided with an inwardly projecting stub axle for carrying axle hooks.

In testimony whereof, I have signed my name to this specification.

MICHAEL WATTER.